US010112780B2

United States Patent
Kovacs et al.

(10) Patent No.: US 10,112,780 B2
(45) Date of Patent: Oct. 30, 2018

(54) FLEXIBLE AND ADJUSTABLE ROLLER SCRAPERS

(71) Applicant: Laitram, L.L.C., Harahan, LA (US)

(72) Inventors: Joseph F. Kovacs, New Orleans, LA (US); Christopher G. Greve, Covington, LA (US); Robert S. Lapeyre, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 934 days.

(21) Appl. No.: 14/459,711

(22) Filed: Aug. 14, 2014

(65) Prior Publication Data

US 2015/0059117 A1    Mar. 5, 2015

Related U.S. Application Data

(60) Provisional application No. 61/871,052, filed on Aug. 28, 2013.

(51) Int. Cl.
| | |
|---|---|
| *B65G 45/12* | (2006.01) |
| *B07B 1/52* | (2006.01) |
| *B07B 13/07* | (2006.01) |
| *B65G 45/10* | (2006.01) |
| *B08B 1/00* | (2006.01) |

(Continued)

(52) U.S. Cl.
CPC .............. *B65G 45/10* (2013.01); *B07B 1/145* (2013.01); *B07B 1/4636* (2013.01); *B07B 1/526* (2013.01); *B07B 13/072* (2013.01); *B08B 1/00* (2013.01); *B08B 1/005* (2013.01); *B65G 45/12* (2013.01); *Y10T 29/49826* (2015.01)

(58) Field of Classification Search
CPC .......... B08B 1/005; B07B 1/14; B07B 1/145; B07B 1/15; B07B 1/155
USPC ....... 15/3.11, 256.51; 209/667–673; 210/396
See application file for complete search history.

(56) References Cited

U.S. PATENT DOCUMENTS

| | | | | |
|---|---|---|---|---|
| 429,381 A | * | 6/1890 | Harvey .................. | D21G 3/005 15/256.51 |
| 481,866 A | * | 8/1892 | Harvey .................. | D21G 3/005 15/256.51 |

(Continued)

FOREIGN PATENT DOCUMENTS

| | | |
|---|---|---|
| CN | 2707703 Y | 7/2005 |
| CN | 2871021 Y | 2/2007 |

(Continued)

OTHER PUBLICATIONS

Search Report and Written Opinion of the Dutch Patent Office for corresponding Dutch Patent Application No. 2013324, dated Aug. 7, 2015.

(Continued)

*Primary Examiner* — Randall Chin
(74) *Attorney, Agent, or Firm* — Catherine M. Bishop

(57) ABSTRACT

A flexible scraper for a grader or other solid object processing system. The flexible scraper is adjustably mounted to a frame and contacts a rotating roller to clean the rotating roller or prevent components from wrapping around the roller, as well as maintain products within designated lanes. Connectors allow insertion and release of the scraper into and from the frame. The flexible scraper is inserted into slots in the frame and held against the rotating roller by gravity.

11 Claims, 10 Drawing Sheets

(51) Int. Cl.
*B07B 1/14* (2006.01)
*B07B 1/46* (2006.01)

(56) References Cited

U.S. PATENT DOCUMENTS

| | | | | |
|---|---|---|---|---|
| 891,694 | A | * 6/1908 | Hill | B21B 28/04 |
| | | | | 15/256.51 |
| 1,661,501 | A | 3/1928 | Riddell | |
| 3,770,123 | A | 11/1973 | Mraz | |
| 5,372,546 | A | * 12/1994 | Brakke | A01D 17/06 |
| | | | | 171/58 |
| 5,824,356 | A | * 10/1998 | Silver | A23N 12/005 |
| | | | | 134/25.3 |

FOREIGN PATENT DOCUMENTS

| | | |
|---|---|---|
| CN | 202015683 U | 10/2011 |
| CN | 203018324 U | 6/2013 |
| DE | 102009004945 A1 | 7/2010 |
| EP | 0562692 A1 | 9/1993 |
| JP | H091070 A | 1/1997 |
| WO | 2010068966 A1 | 6/2010 |

OTHER PUBLICATIONS

Office Action and Search Report of Chinese Patent Application No. 201410429379.8, dated Aug. 21, 2017, State Intellectual Property Office of P.R. China (with English Translation).

* cited by examiner

FLEXIBLE AND ADJUSTABLE ROLLER SCRAPERS

RELATED APPLICATIONS

This application claims priority to U.S. Provisional Patent Application No. 61/871,052 filed Aug. 28, 2013, the contents of which are herein incorporated by reference.

BACKGROUND

The invention relates generally to apparatus and methods for processing solid objects and, more particularly, to a device for cleaning rollers in a processor.

Processors, such as graders, peelers, cleaners, freezers, coolers, and cookers, may process solid objects in batches. For example, graders may be used to sort objects into different sizes, or grades. Peelers may be used to removes shells or skins from objects. Solid objects that may be processed in batches include food products, such as fruits, vegetables, nuts, shellfish, portions of meat, poultry, and fish, and non-food products, such as ball bearings, castings, and aggregates.

In processors with rotating rollers, such as graders, articles being processed may become entangled in the rollers, inhibiting proper operation. For example, shrimp whiskers may wrap around rotating rollers, causing problems. Another problem is that articles being processed may jump between lanes, complicating the processing of the articles.

SUMMARY

A roller scraper for a processor, such as a grader, comprises a flexible blade extending from a base. The scraper is mounted in a frame of the processor, which includes slots for receiving connectors of the scraper. The scraper wipes a rotating roller of the processor. An array of scrapers may be mounted in the frame, with each scraper contacting an associated roller.

According to one aspect, a processor for processing solid objects comprises a frame, a plurality of rollers extending in a longitudinal direction mounted to the frame and a plurality of scrapers mounted to the frame. Each scraper comprises a blade that contacts an associated roller. The position of each scraper is adjustable relative to the frame.

According to another aspect, a scraper for a processor of solid objects comprises a base extending longitudinally from a first end to a second end, a flexible blade extending downwards from the base, a first mounting tab coupled to the first end of the base and a first connector extending from the first mounting tab for mounting the scraper to a frame of the processor.

According to another aspect, a method of assembling a processor for processing solid objects comprises the steps of providing a processor having a plurality of longitudinally extending rollers mounted to a frame, providing a scraper having a flexible blade and inserting the scraper into slots in the frame so that blade of the scraper contacts a roller of the processor.

BRIEF DESCRIPTION OF THE DRAWINGS

These features and aspects of the invention, as well as its advantages, are described in more detail in the following description, appended claims, and accompanying drawings, in which:

DETAILED DESCRIPTION

The present invention provides an improved, flexible scraper for wiping the rollers of a processor, such as a grader. The invention will be described relative to certain illustrative embodiments, though those skilled in the art will recognize that the invention is not limited to the illustrative embodiments.

Figure 1:
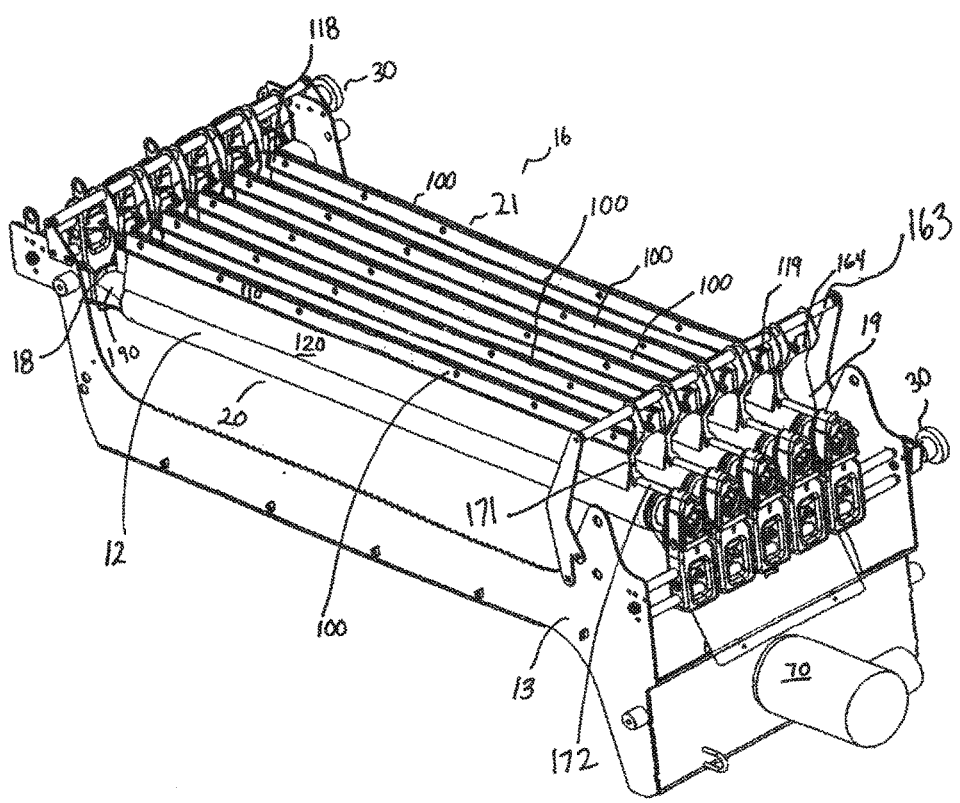
FIG. 1 illustrates a grading section of a grader with an array of longitudinally extending rollers and an array of scrapers contacting the rollers according to an illustrative embodiment of the invention.
Figure 2:
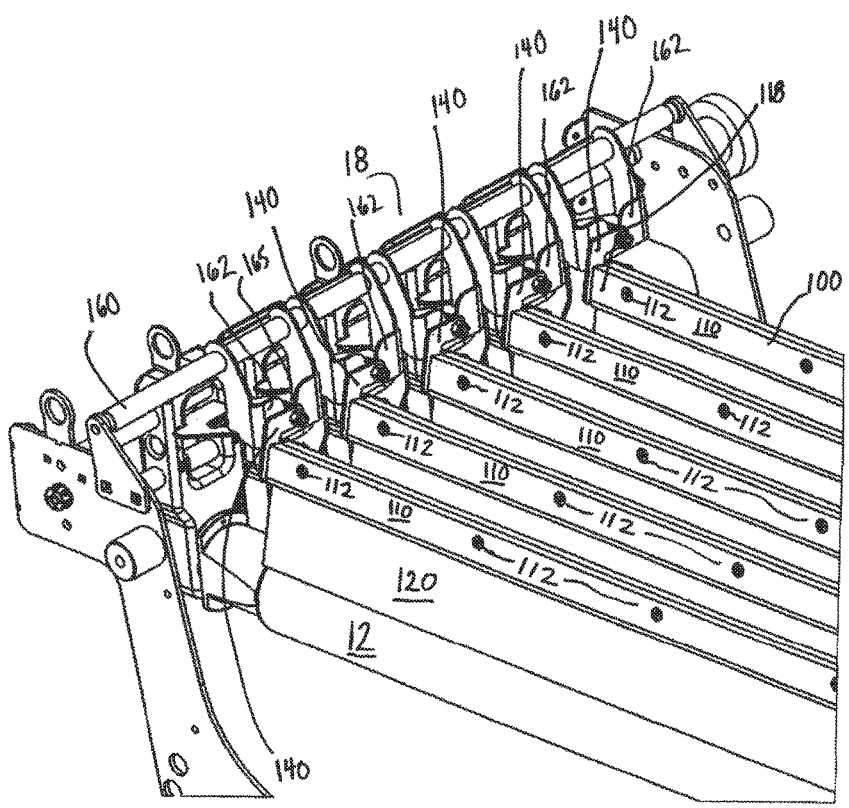
FIG. 2 is an isometric view of the downstream portion of the grading section of FIG. 1.

FIG. 1 illustrates a grading section 16 of a grader including scrapers 100 of an illustrative embodiment of the invention. FIG. 2 is a detailed view of a discharge or downstream portion of the grading section 16. The scrapers 100 may be used with any suitable solid object processor having processing channels and is not limited to use with a grader with grading channels formed by rotating rollers.

Figure 3:
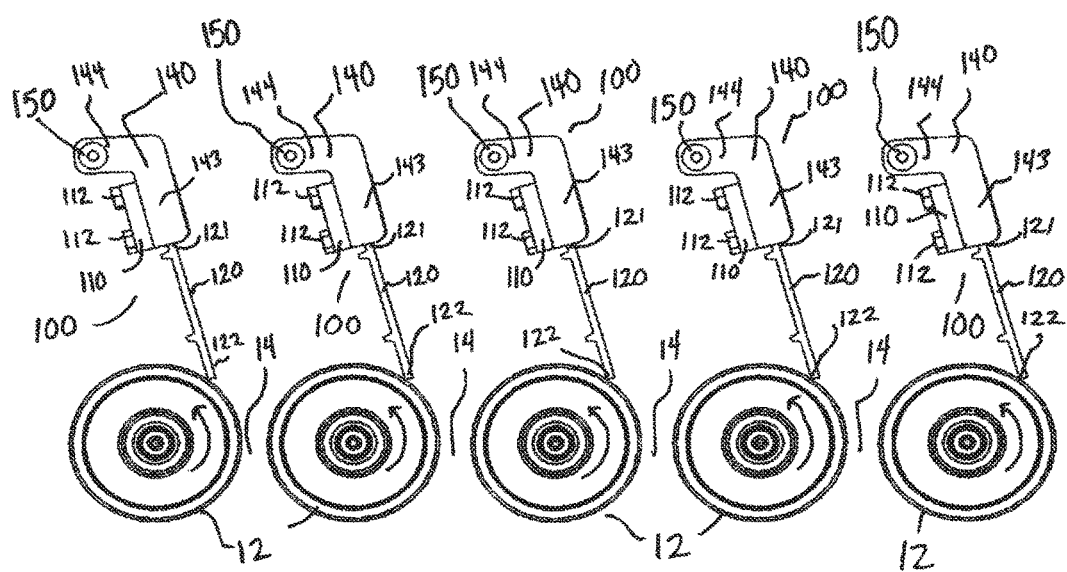
FIG. 3 is a front view of an array of scrapers contacting rollers in the grading section of FIG. 1.
Figure 4:
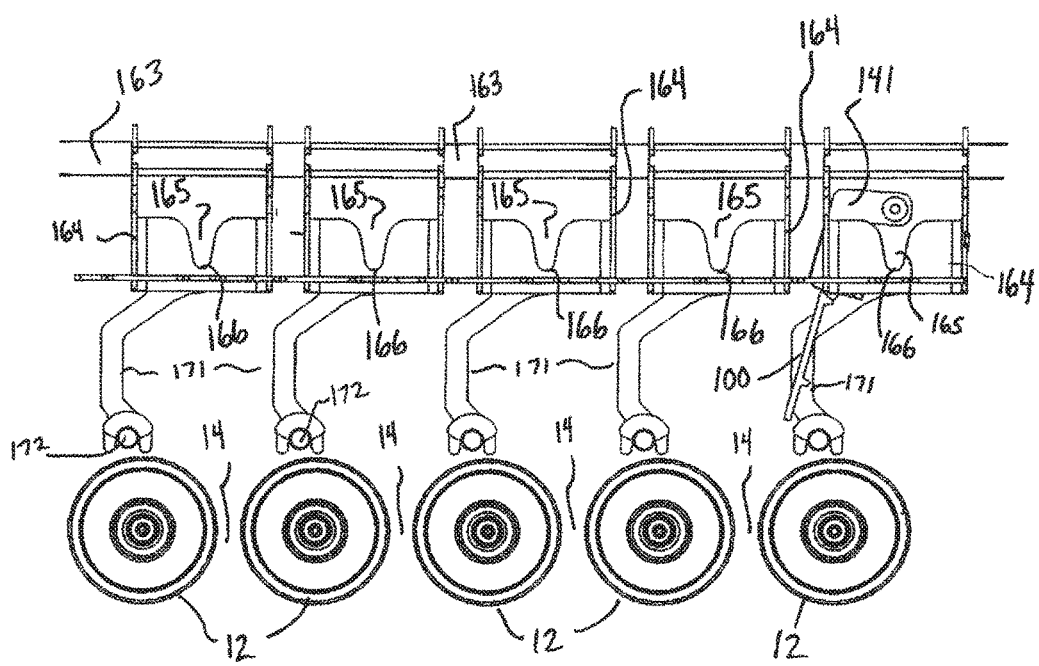
FIG. 4 is an end view of the rollers, a scraper and upstream scraper receptacles of the grading section of FIG. 1.

The grading section 16 comprises a planar array of grading channels, comprising rotatable grading rollers 12 separated across gaps 14, shown in FIGS. 3 and 4. In this example, the grading section has five cylindrical rollers, all of the same diameter. But more or fewer rollers could be used to match the throughput requirement. The grading section 16 extends in length in the axial direction of the rollers 12 from an infeed end 19 to an opposite exit end 18 and laterally in width from a first side 20 more or less at the outer side of one of the outermost rollers to a second side 21 at the outer side of the opposite outermost roller. Grading section 16 and all the other components of the grader are supported in a frame 13. An example of a suitable grader is described in U.S. patent application Ser. No. 13/342,266 (US Patent Application Publication 2012/0193272), now U.S. patent No. 8,720,695 entitled "Grader," the contents of which are incorporated by reference. Alternatively, the scrapers may be used with another type of grader, such as the grading machines described in U.S. Pat. Nos. 3,770,123, 4,172,527, 4,979,624, or other processor, such as the shrimp peeling systems available from Laitram Machinery of Harahan, La.

Figure 5:
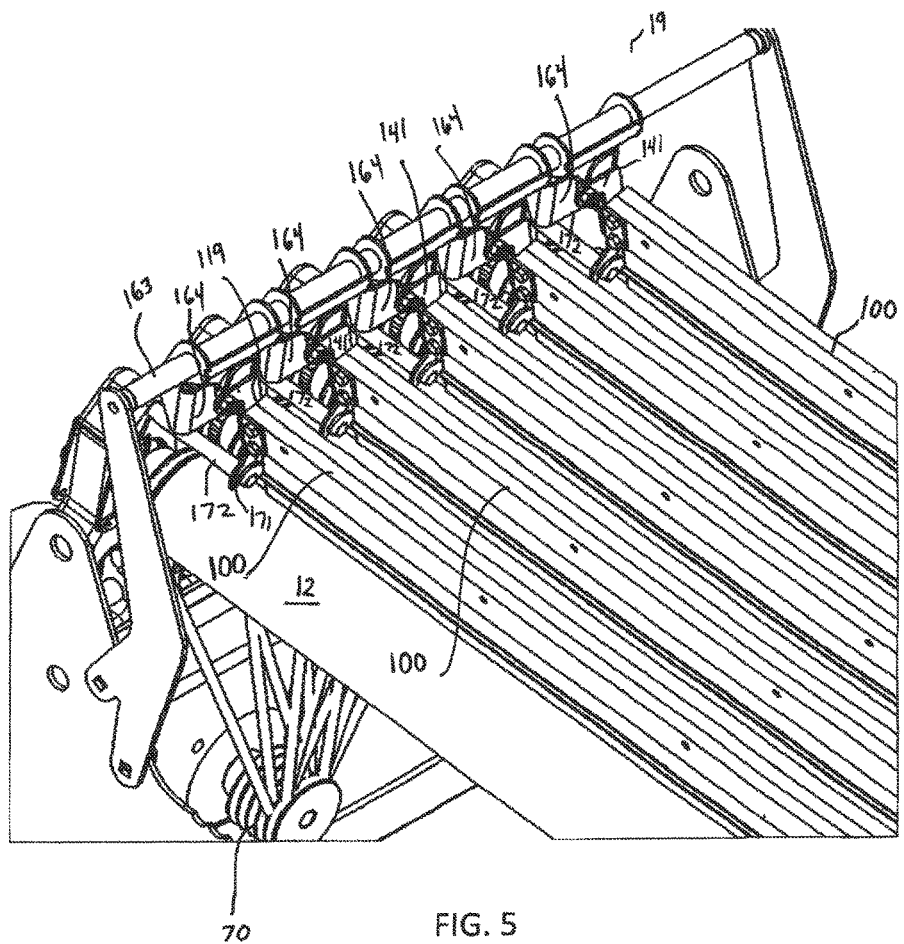
FIG. 5 is an isometric view of the upstream portion of the grading section of FIG. 1.

The illustrative axes of rotation of the rollers diverge from the infeed end to the opposite end. The gaps between laterally consecutive rollers 12 form gauging passages that increase in width from a minimum gauge $G_{min}$ at the infeed end 19 to a maximum gauge $G_{max}$ at the opposite exit end 18. In this case, the five grading rollers form four gauging passages. A drive system 70, shown in FIG. 5, coupled to the rollers 12 rotates the rollers to facilitate grading. In one embodiment, the drive system rotates all the rollers in the same direction on their axes. Alternatively, the rollers rotate in opposite directions. Products fed into the grading section 16 advance along its length in the gaps. When a product advancing along the gap reaches a position along the widening gauging passage at which the passage width exceeds the lateral dimension of the product, the product falls through the passage under the influence of gravity. Thus, smaller products fall closer to the infeed end 19, and larger products, closer to the opposite end 18. Products whose lateral dimensions exceed the maximum gauge $G_{max}$ drop off the exit end 18 of the grader into a chute or other outfeed device for further processing.

The grader may also include a passage-width adjustment mechanism 30 coupled to the rollers to adjust the width of the gauging passages between the rollers 12 in unison. An adjustment mechanism 30 may be located at one or both ends of the rollers to allow adjustments to the spacing between the rollers at either or both ends of the grading section.

Graded products that pass through the gauging passages drop onto one or more collection devices. Suitable collection devices include a conveyor belt disposed below the grading section 16 and running transverse to the length direction of the grading section and collection bins. Other suitable means known in the art for grading or otherwise processing solid objects may be used.

The flexible scrapers 100 are mounted above the rollers 12 and contact the outer surface of the rotating rollers 12 to remove debris, prevent tangling and sticking, and—or contain the articles being graded within the prescribed gauging passages. For example, the flexible scrapers 100 are particularly suitable for preventing the whiskers of shrimp being graded from wrapping around the roller 12. In another application, the flexible scrapers 100 prevent products from skipping from one gauging passage to another.

Each scraper comprises a base 110 extending from a first end 119 to a second end 118. A flexible blade 120 extends from the base 110 and hangs downwards by gravity. The fixed end 121 of the flexible blade 120 may be sandwiched between two base components held together with fasteners 112. The free end 122 of the flexible blade 120 contacts an upward rolling portion of a corresponding roller 12, as shown in FIG. 3. The blades 120 may be formed of any suitable flexible material, including, but not limited to, plastic, rubber, thin metal and combinations thereof. The free end 122 may be tapered or blunt or have any suitable configuration.

The scrapers are adjustably and removably mounted to the frame 13 of the grader to allow for easy insertion and removal. As shown in FIGS. 2-5, each scraper 100 includes mounting tabs 140, 141 at the first and second ends 118, 119. The mounting tabs 140, 141 each include a first leg 143 connected to the end of the base 110 and a second leg 144 extending at an obtuse angle relative to the first leg 143. The second leg 144 is substantially horizontal when the scraper is mounted to the frame, so that the blade 120 extends downwards at a non-vertical angle, though the invention is not so limited.

Figure 6A:
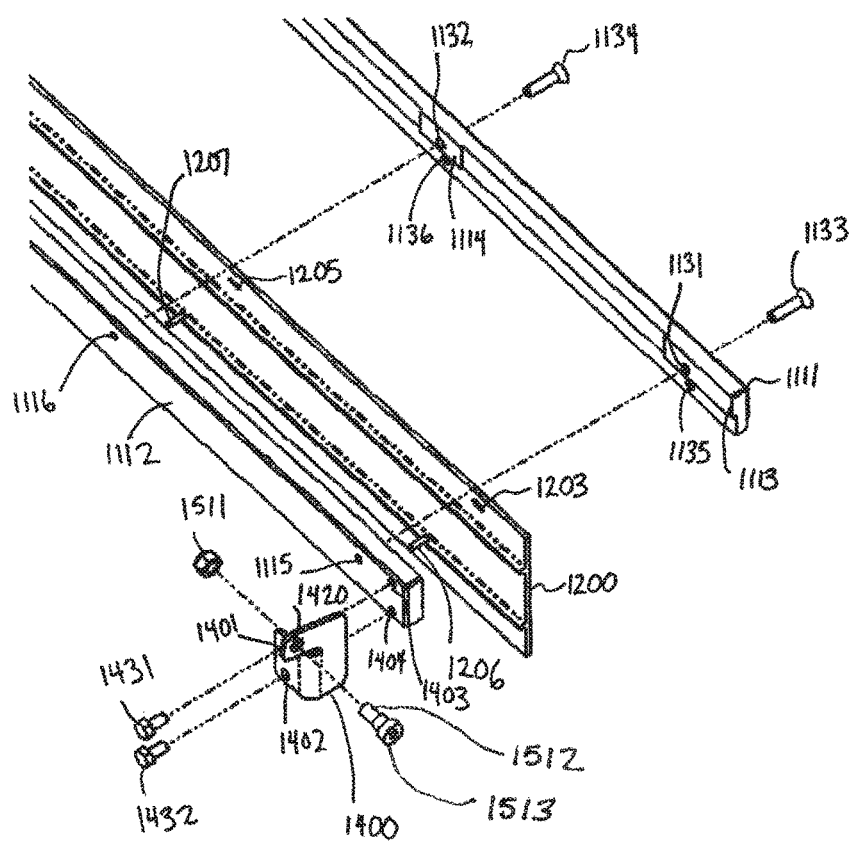
FIGS. 6A and 6B are exploded views of an end of a scraper for a grader according to an embodiment of the invention.
Figure 6B:
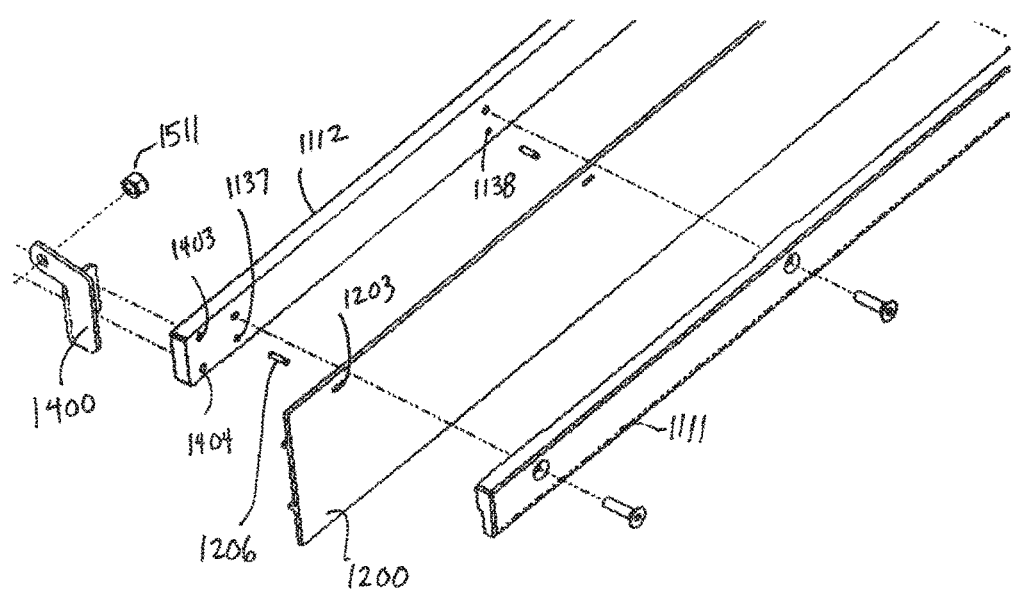
Figure 7:
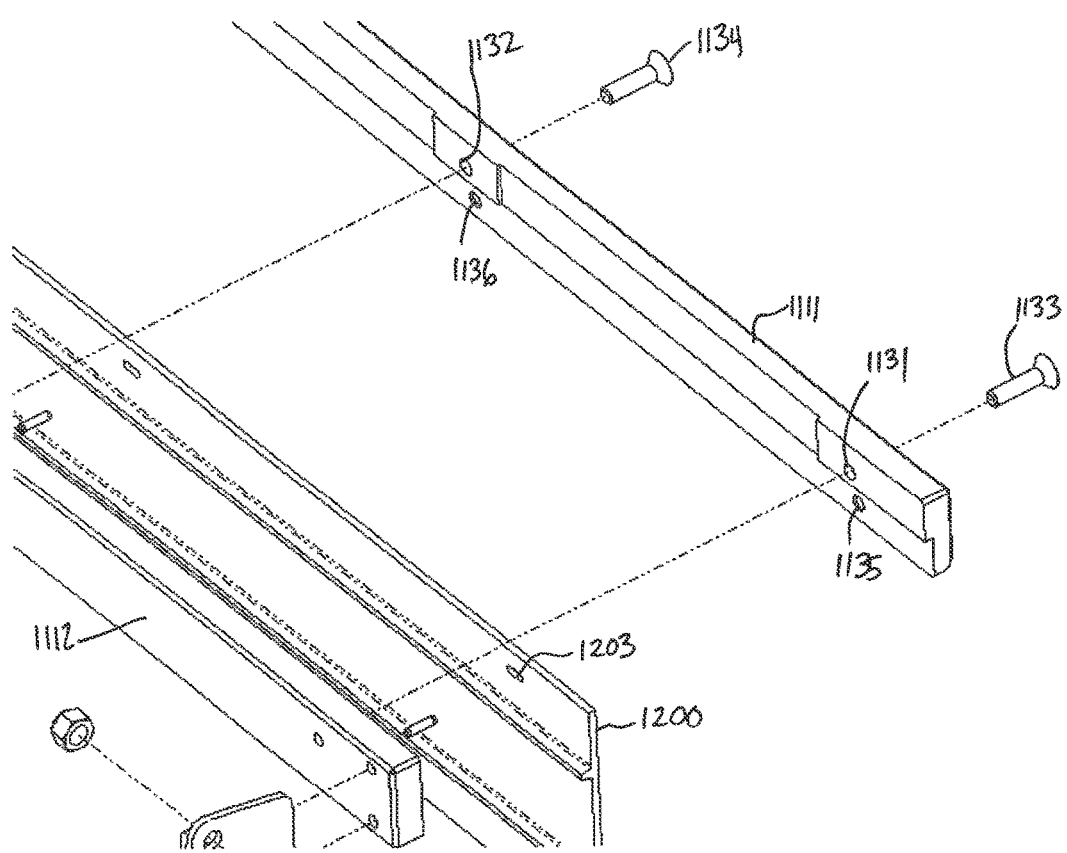
FIG. 7 is a close-up exploded view of the base, blade and fasteners of the scraper of FIGS. 6A and 6B.
Figure 8:
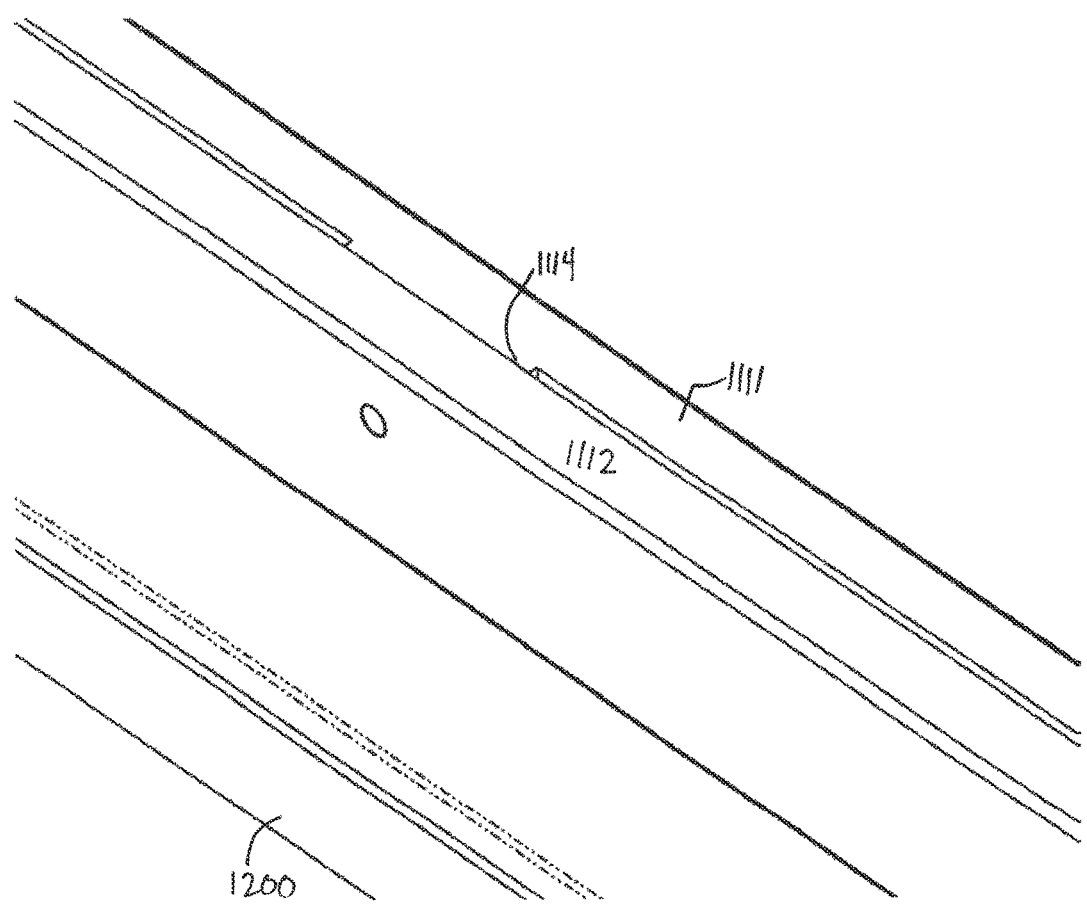
FIG. 8 is an assembled close-up view of the scraper of FIGS. 6A and 6B.
Figure 9:
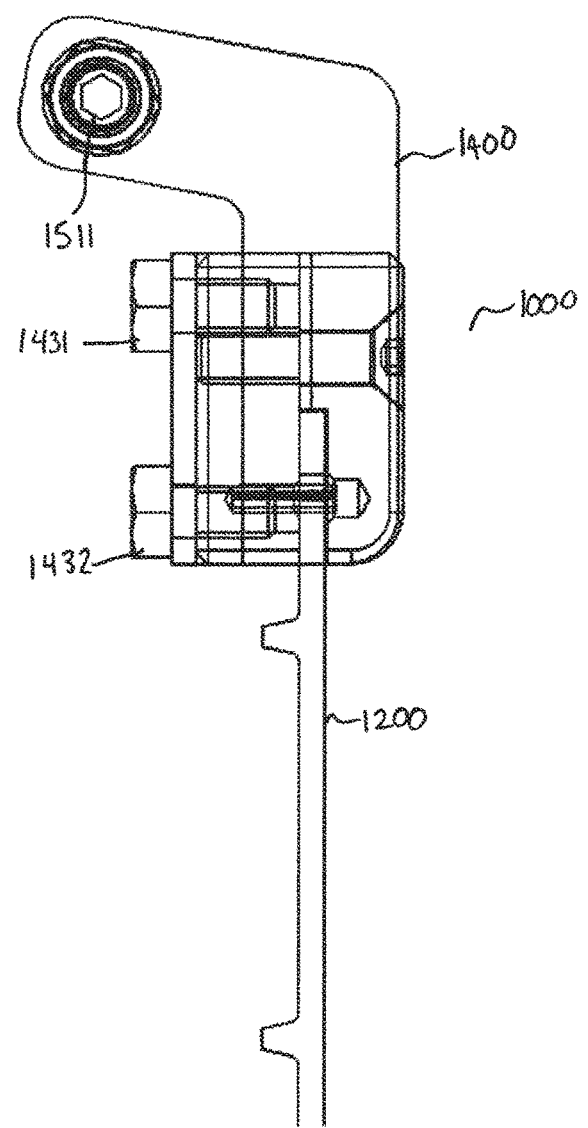
FIG. 9 is an end view of the scraper of FIGS. 6A and 6B when assembled.

A connector 150 extends from each mounting tab to mount the scraper 100 to the frame 13. The illustrative connector 150 extends substantially perpendicularly from the second leg 144 in a longitudinally outward direction and comprises a neck 1512 and a head 1513 (shown in FIG. 6A). The illustrative head of the connector 150 is substantially disc-shaped.

The frame 13 includes receptacles for receiving the connectors 150. At the discharge end, the frame includes an overhead bar 160, as shown in FIG. 2, from which the downstream receptacles 162 hang. At the infeed end of the rollers 12, the frame 13 includes an overhead bar 163 from which the upstream receptacles 164 hang. The receptacles 162, 164 include slots 165 for receiving the connectors 150 of the scrapers 100. Each slot 165 preferably has an open top and tapers towards the bottom, and includes a bottom curved surface 166. To mount the scrapers to the frame 13, the neck of each connector 150 is inserted in a slot 165. The connectors 150 can ride up and down, as well as rotate, in the slots 165 and are held in place by gravity. The blade portion 120 falls down and contacts the outer surface of the associated roller. The ability to move up and down and rotate about the neck in the slots 165 helps the blade 120 to maintain contact with the associated roller 12 during operation, and even when the position of the rollers changes.

The position of the upstream receptacles 164 may be adjusted to adjust the position or orientation of the scrapers 100. A shown in FIGS. 1, 4 and 5, the upstream receptacles 164 connect to arms 171, which connect to rods 172. The rods 172 are connected to the grader adjustment mechanism 30, so that adjustment of the rollers 12 also adjusts the position of the upstream receptacles 164, and, consequently, the position of any scrapers 100 mounted in the receptacles. In this manner, the scrapers 100 automatically adjust position to maintain contact with the rollers 12.

As shown in FIG. 1, one or more ends of the rollers 12 may include a cap 190. The cap 190 may be fixed relative to the frame and include flat sides. The cap receives the end of the rotating roller 12, but remains substantially stationary to prevent whisker wrap or other entanglements at the end of the rollers.

FIGS. 6A-9 show the mounting of a scraper blade 1200 between two base components 1111 and 1112 using fasteners according to an embodiment of the invention. A mounting tab 1400 attaches to the base component 1112 for mounting the assembled scraper 1000 to a frame of a processor, such as a grader. The first base components 1111 includes upper inside projections 1113 in which are formed openings 1131, 1132 for receiving upper fasteners 1133, 1134. The upper fasteners 1133, 1134 pass through openings 1115, 1116 in the second base component 1112 to couple the base components together. The scraper blade 1200 includes slots 1203, 1205 for receiving posts 1206, 1207 for mounting the blade 1200 to the connected base components via openings, shown as recesses 1135, 1136, 1137, 1138. The slots for mounting the scraper blade allow a loose connection to enable expansion of the material with temperature changes to prevent buckling.

The mounting tab 1400 couples to the base component 1112 by passing fasteners 1431, 1432 through aligned openings 1401, 1402, 1403, 1404. An upper fastener 1511 passes through a top opening 1420 of the mounting tab to form a connector with a neck 1512 and head 1513 for adjustably mounting the scraper 1000 to a frame. Any suitable means for housing a flexible scraper blade and adjustably mounting the scraper blade to a frame may be used, and the invention is not limited to the embodiments shown herein.

Although the invention has been described in detail with reference to a few exemplary versions, other versions are possible. So, as these few examples suggest, the scope of the claims is not meant to be limited to the versions described in detail.

What is claimed is:

1. A processor for processing solid objects, comprising:
a frame;
a plurality of rollers extending in a longitudinal direction mounted to the frame;
a plurality of receptacles hanging at a first end of the plurality of rollers above the rollers, each receptacle including a slot with an open top;
a plurality of scrapers mounted to the frame, each scraper comprising a longitudinally extending base receiving a flexible blade that hangs down and contacts an associated roller, the base having a first mounting tab at a first end of the base, the first mounting tab including a connector extending in the longitudinal direction that is received in a slot of a corresponding receptacle, so that the position of each scraper is adjustable relative to the frame.

2. The processor of claim 1, wherein the connector comprises a neck and a head.

3. The processor of claim 1, wherein the head is round and each slot is tapered and has a rounded bottom.

4. The processor of claim 1, further comprising an adjustment mechanism connected to the frame for adjusting the position of the rollers, wherein the receptacles are connected to the adjustment mechanism for adjusting the position of the rollers.

5. The processor of claim 1, wherein the rollers rotate about a longitudinal axis, and each blade contacts an upward rolling portion of an associated roller.

6. A method of assembling a processor for processing solid objects, comprising:
providing a processor having a plurality of longitudinally extending rollers mounted to a frame;
providing a scraper having a connector and a flexible blade; and
inserting the connector of the scraper through an open top into a tapering slot in the frame so that the flexible blade contacts a roller of the processor.

7. The method of claim 6, further comprising the step of adjusting the position of the scraper relative to the frame.

8. A processor for processing solid objects, comprising:
a frame;
a plurality of rollers extending in a longitudinal direction mounted to the frame;
a plurality of receptacles hanging at a first end of the plurality of rollers, each receptacle including a slot;
a plurality of scrapers mounted to the frame, each scraper comprising a longitudinally-extending base receiving a flexible blade and having a first mounting tab at a first end of the base, the first mounting tab comprises a first leg, a second leg extending at an obtuse angle relative to the first leg and a connector extending from the second leg for insertion in a corresponding slot to mount the scraper to the frame.

9. The processor of claim 8, further comprising a second mounting tab connected to the second end of the base and a second connector extending from the second mounting tab.

10. The processor of claim 8, wherein the second leg is substantially horizontal when the scraper is mounted to the frame.

11. The processor of claim 8, wherein each connector extends substantially perpendicular from the second leg in a longitudinally outward direction and comprises a neck and a head.

* * * * *